United States Patent [19]

Popovich

[11] Patent Number: 5,996,794
[45] Date of Patent: Dec. 7, 1999

[54] PHOTOGRAPH STORAGE DEVICE

[76] Inventor: Steven Popovich, 353 Strathearne Avenue, Hamilton, Ontario, Canada, L8H-5L2

[21] Appl. No.: 09/138,387

[22] Filed: Aug. 24, 1998

[51] Int. Cl.$^6$ .............................. B65D 85/30; A47G 1/16
[52] U.S. Cl. ........................ 206/456; 206/425; 211/41.13
[58] Field of Search .................................... 206/455, 456, 206/449, 425; 211/11, 41.13, 120; 312/129, 132

[56] References Cited

U.S. PATENT DOCUMENTS

| | | | |
|---|---|---|---|
| 1,809,781 | 6/1931 | Gross | 206/456 X |
| 1,845,470 | 2/1932 | Wood | 206/425 X |
| 2,119,407 | 5/1938 | Weiskopf | 211/41.13 X |
| 2,511,730 | 6/1950 | McClain | 211/41.13 |
| 2,619,233 | 11/1952 | Weiskopf | 206/449 X |
| 2,630,219 | 3/1953 | Pierce | 206/456 |
| 3,180,697 | 4/1965 | Mulch | 206/456 X |
| 4,139,097 | 2/1979 | Bowman et al. | 206/425 |
| 5,147,041 | 9/1992 | Lemieux et al. | 206/449 |
| 5,344,015 | 9/1994 | Carlin et al. | 206/449 |

*Primary Examiner*—Bryon P. Gehman

[57] ABSTRACT

A photograph storage device including a container. A photo rack is slidably received within the container. The photo rack includes a base member. The base member has a plurality of sleeves pivotally secured thereto along a length thereof. Each of the sleeves is dimensioned for holding at least one photograph therein. A cover member slidably couples with the container.

8 Claims, 2 Drawing Sheets

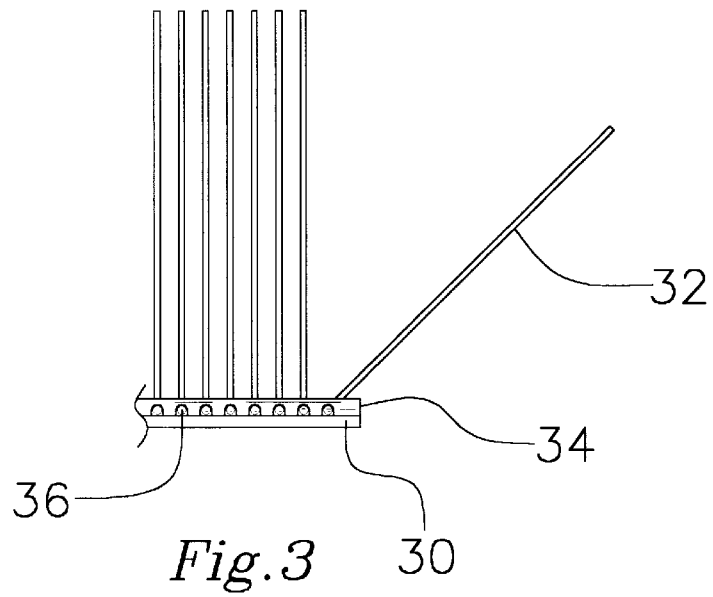
Fig.3
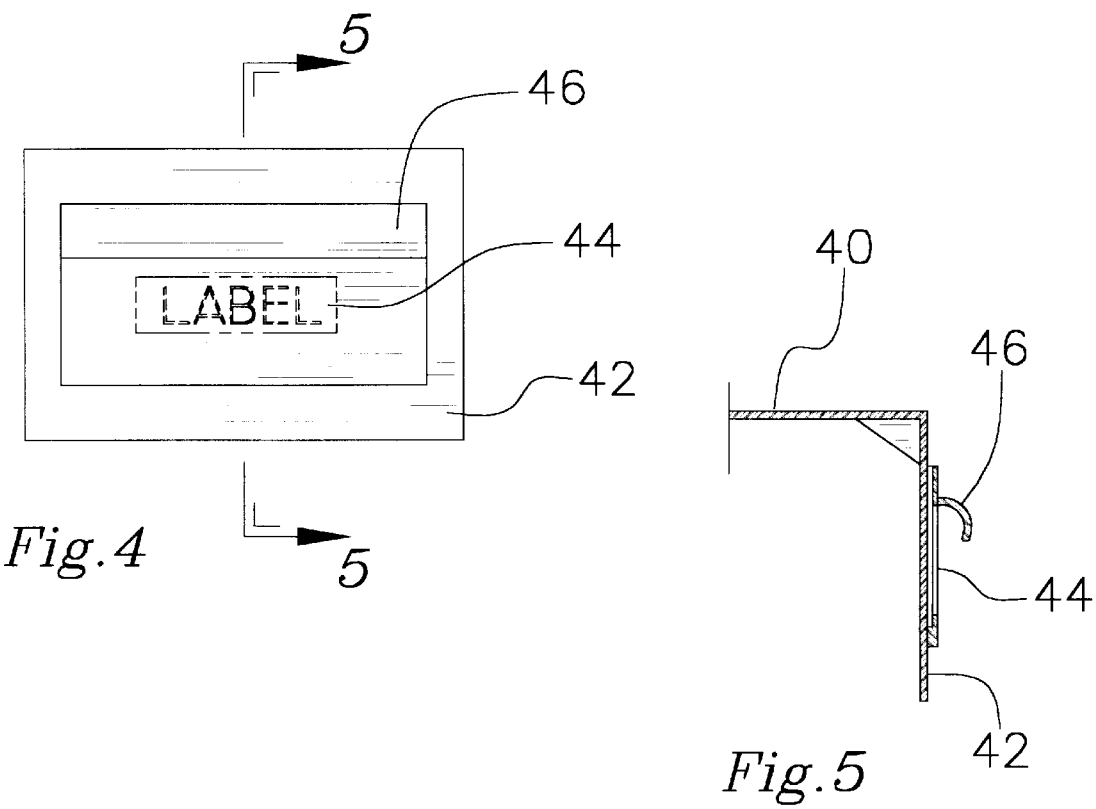
Fig.4
Fig.5

PHOTOGRAPH STORAGE DEVICE

BACKGROUND OF THE INVENTION

1. Field of the Invention

The present invention relates to a photograph storage device and more particularly pertains to storing and protecting photographs with a photograph storage device.

2. Description of the Prior Art

The use of photo albums is known in the prior art. More specifically, photo albums heretofore devised and utilized for the purpose of displaying photographs are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,320,591 to Dorman; U.S. Pat. No. 4,514,919 to Plutsky; U.S. Pat. No. 4,139,097 to Bowman et al.; U.S. Pat. No. 2,638,903 to Janovsky; U.S. Pat. No. 3,265,072 to Gross; Patent Number EP 0 438 034 A2 to Stancato; and Patent Number WO 93/05964 to Policht.

While these devices fulfill their respective, particular objective and requirements, the aforementioned patents do not describe a photograph storage device for storing and protecting photographs.

In this respect, the photograph storage device according to the present invention substantially departs from the conventional concepts and designs of the prior art, and in doing so provides an apparatus primarily developed for the purpose of storing and protecting photographs.

Therefore, it can be appreciated that there exists a continuing need for new and improved photograph storage device which can be used for storing and protecting photographs. In this regard, the present invention substantially fulfills this need.

SUMMARY OF THE INVENTION

In the view of the foregoing disadvantages inherent in the known types of photo albums now present in the prior art, the present invention provides an improved photograph storage device. AAs such, the general purpose of the present invention, which will be described subsequently in greater detail, is to provide a new and improved photograph storage device and method which has all the advantages of the prior art and none of the disadvantages.

To attain this, the present invention essentially comprises a container having a generally rectangular configuration. The container is defined by an open upper end, a closed lower end, an open front, a closed back, and opposed side walls. Each of the opposed side walls have an elongated track secured thereto disposed downwardly with respect to the open upper end. The closed lower end has a pair of protrusions extending upwardly therefrom inwardly of the open front. A photo rack is slidably received within the container. The photo rack includes a base member. The base member has a plurality of sleeves pivotally secured thereto along a length thereof. Each of the sleeves are dimensioned for holding at least one photograph therein. The base member has a pair of support bars extending along long side edges thereof. The pair of support bars are positioned whereby a space exists between the base member and the support bars. Each of the sleeves have a pivot bar secured to lower ends thereof. The pivot bar of each of the sleeves are positioned within the space between the support bars and the base member to facilitate sliding and pivoting with respect to the base member. A cover member slidably couples with the container. The cover member has a rectangular upper member slidably received between the elongated tracks of the container for covering the open upper end. The upper member has a downwardly extending front face covering the open front of the container. The front face is positioned inwardly of the pair of protrusions of the container in a closed orientation. The front face has a label disposed on an outer surface thereof. The outer surface has an arcuate handle extending outwardly therefrom.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved photograph storage device which has all the advantages of the prior art photo albums and none of the disadvantages.

It is another object of the present invention to provide a new and improved photograph storage device which may be easily and efficiently manufactured and marketed.

It is a further object of the present invention to provide a new and improved photograph storage device which is of durable and reliable construction.

An even further object of the present invention is to provide a new and improved photograph storage device which is susceptible of a low cost of manufacture with regard to both materials and labor, and which accordingly is then susceptible of low prices of sale to the consuming public, thereby making such a photograph storage device economically available to the buying public.

Even still another object of the present invention is to provide a new and improved photograph storage device for storing and protecting photographs.

Lastly, it is an object of the present invention to provide a new and improved photograph storage device including a container. A photo rack is slidably received within the container. The photo rack includes a base member. The base member has a plurality of sleeves pivotally secured thereto along a length thereof. Each of the sleeves are dimensioned for holding at least one photograph therein. A cover member slidably couples with the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a sectional side view of the photo rack of the present invention.

FIG. 4 is a front view of the sliding cover of the present invention.

FIG. 5 is a cross-sectional view of the present invention as taken along line 5—5 of FIG. 4.

The same reference numerals refer to the same parts through the various figures.

DESCRIPTION OF THE PREFERRED EMBODIMENT

Figure 1:
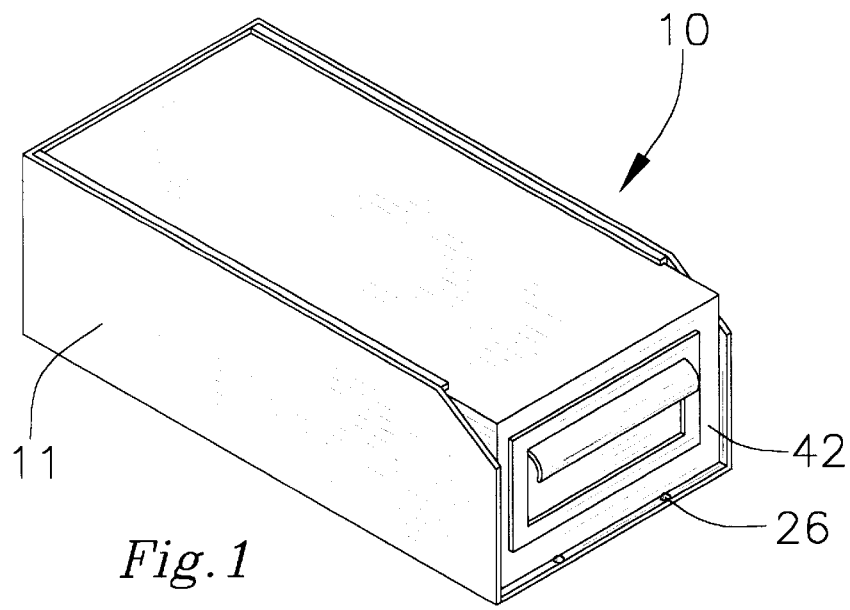
FIG. 1 is a perspective view of the preferred embodiment of the photograph storage device constructed in accordance with the principles of the present invention.
Figure 2:
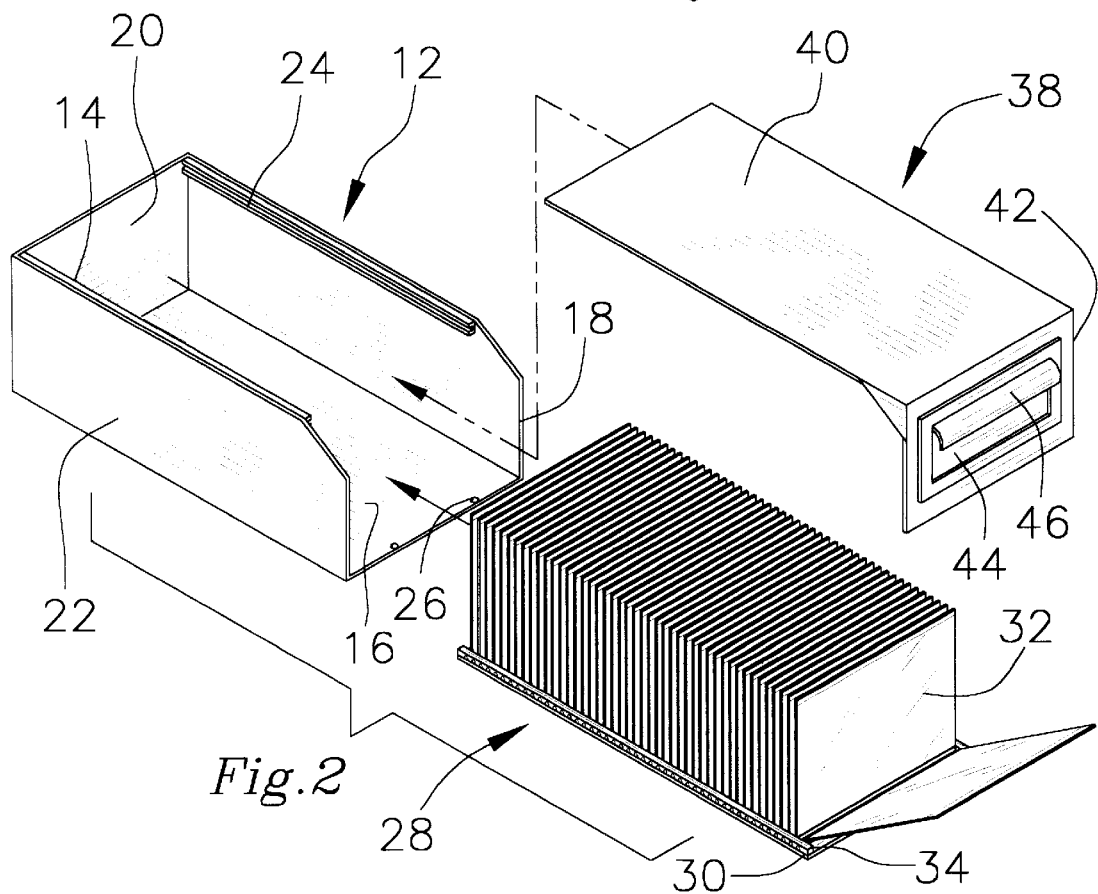
FIG. 2 is an exploded perspective view of the present invention.

With reference now to the drawings, and in particular, to FIGS. 1 through 5 thereof, the preferred embodiment of the new and improved photograph storage device embodying the principles and concepts of the present invention and generally designated by the reference number 10 will be described.

Specifically, it will be noted in the various Figures that the device relates to a photograph storage device for storing and protecting photographs. In its broadest context, the device consists of a container, a photo rack, and a cover member. Such components are individually configured and correlated with respect to each other so as to attain the desired objective.

The container 12 has a generally rectangular configuration. The container 12 is defined by an open upper end 14, a closed lower end 16, an open front 18, a closed back 20, and opposed side walls 22. Each of the opposed side walls 22 have an elongated track 24 secured thereto disposed downwardly with respect to the open upper end 14. The closed lower end 16 has a pair of protrusions 26 extending upwardly therefrom inwardly of the open front 18.

The photo rack 28 is slidably received within the container 12. The photo rack 28 includes a base member 30. The base member 30 has a plurality of sleeves 32 pivotally secured thereto along a length thereof. Each of the sleeves 32 are dimensioned for holding at least one photograph therein. The base member 30 has a pair of support bars 34 extending along long side edges thereof. The pair of support bars 34 are positioned whereby a space exists between the base member 30 and the support bars 34. Each of the sleeves 32 have a pivot bar 36 secured to lower ends thereof. The pivot bar 36 of each of the sleeves 32 are positioned within the space between the support bars 34 and the base member 30 to facilitate sliding and pivoting with respect to the base member 30.

The cover member 38 slidably couples with the container 12. The cover member 38 has a rectangular upper member 40 slidably received between the elongated tracks 24 of the container 12 for covering the open upper end 14. The upper member 40 has a downwardly extending front face 42 covering the open front 18 of the container 12. The front face 42 is positioned inwardly of the pair of protrusions 26 of the container 12 in a closed orientation. Note FIG. 1. The front face 42 has a label 44 disposed on an outer surface thereof. The label 44 is removably received within a clear plastic sleeve to allow for changing. The outer surface has an arcuate handle 46 extending outwardly therefrom. The arcuate handle 46 facilitates removal of the cover member 38 from the container 12 to gain access to the photo rack 28.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A photograph storage device for storing and protecting photographs, comprising, in combination:

a container having a generally rectangular configuration, the container being defined by an open upper end, a closed lower end, an open front, a closed back, and opposed side walls, each of the opposed side walls having an elongated track secured thereto disposed downwardly with respect to the open upper end, the closed lower end having a pair of protrusions extending upwardly therefrom inwardly of the open front;

a photo rack slidably received within the container, the photo rack including a base member, the base member having a plurality of sleeves pivotally secured thereto along a length thereof, each of the sleeves being dimensioned for holding at least one photograph therein, the base member having a pair of support bars extending along long side edges thereof, the pair of support bars being positioned whereby a space exists between the base member and the support bars, each of the sleeves having a pivot bar secured to lower ends thereof, the pivot bar of each of the sleeves positioned within the space between the support bars and the base member to facilitate sliding and pivoting with respect to the base member;

a cover member slidably coupling with the container, the cover member having a rectangular upper member slidably received between the elongated tracks of the container for covering the open upper end, the cover member having a downwardly extending front face covering the open front of the container, the front face being positioned inwardly of the pair of protrusions of the container in a closed orientation, the front face having a label disposed on an outer surface thereof, the outer surface having an arcuate handle extending outwardly therefrom.

2. A photograph storage device for storing and protecting photographs comprising:

a container;

a photo rack slidably received within the container, the photo rack including a base member, the base member having a plurality of sleeves pivotally secured thereto along a length thereof, each of the sleeves being dimensioned for holding at least one photograph therein, the base member having a pair of support bars extending along long side edges thereof, the pair of support bars being positioned whereby a space exists between the base member and the support bars, each of the sleeves having a pivot bar secured to lower ends thereof, the pivot bar of each of the sleeves positioned within the space between the support bars and the base member to facilitate sliding and pivoting with respect to the base member; and a cover member slidably coupling with the container.

3. The photograph storage device as set forth in claim 2 wherein the container is defined by an open upper end, a closed lower end, an open front, a closed back, and opposed side walls, each of the opposed side walls having an elongated track secured thereto disposed downwardly with respect to the open upper end for receiving the cover member.

4. The photograph storage device as set forth in claim 3 wherein the closed lower end has a pair of protrusions extending upwardly therefrom inwardly of the open front.

5. The photograph storage device as set forth in claim 2 wherein the cover member has a rectangular upper member slidably received between the elongated tracks of the container for covering the open upper end.

6. The photograph storage device as set forth in claim 5 wherein the cover member has a downwardly extending front face covering the open front of the container, the front face being positioned inwardly of the pair of protrusions of the container in a closed orientation.

7. The photograph storage device as set forth in claim 6 wherein the front face has a label disposed on an outer surface thereof.

8. The photograph storage device as set forth in claim 7 wherein the outer surface has an arcuate handle extending outwardly therefrom.

* * * * *